United States Patent [19]

Lim, deceased et al.

[11] Patent Number: 4,615,038
[45] Date of Patent: Sep. 30, 1986

[54] EQUALIZATION OF MODULATED DATA SIGNALS UTILIZING TENTATIVE AND FINAL DECISIONS AND REPLICATION OF NON-LINEAR CHANNEL DISTORTION

[75] Inventors: Tong L. Lim, deceased, late of Middletown; by Keung-Yi P. Yu, executor, Westfield; Richard D. Gitlin, Little Silver, all of N.J.

[73] Assignee: AT&T Information Systems Inc., Holmdel, N.J.

[21] Appl. No.: 617,979

[22] Filed: Jun. 6, 1984

[51] Int. Cl.$^4$ .............................................. H04B 3/04
[52] U.S. Cl. ........................................ 375/14; 375/12; 333/18; 364/724
[58] Field of Search ................ 375/11, 12, 14, 16, 375/101; 364/724; 333/18

[56] References Cited

U.S. PATENT DOCUMENTS

| | | | |
|---|---|---|---|
| 3,600,681 | 8/1971 | Arbuckle | 325/42 |
| 3,974,449 | 8/1976 | Falconer | 325/321 |
| 4,181,888 | 1/1980 | Falconer | 325/42 |
| 4,213,095 | 7/1980 | Falconer | 375/14 |
| 4,288,872 | 9/1981 | Tamburelli | 375/14 |
| 4,412,341 | 10/1983 | Gersho et al. | 375/102 |

OTHER PUBLICATIONS

"Adaptive Equalization of Channel Nonlinearities in QAM Data Transmission System," *BSTJ*, D. D. Falconer, vol. 57, 1978, pp. 2589-2611.

*Primary Examiner*—Marc E. Bookbinder
*Assistant Examiner*—Raymond C. Glenny
*Attorney, Agent, or Firm*—Barry H. Freedman

[57] ABSTRACT

Apparatus and a technique for equalizing non-linear distortion in a received modulated data signal by (1) forming tentative decisions as to the values of data symbols represented by the signal preferably using a receiver including a conventional linear equalizer, (2) constructing a replica of the non-linear distortion in response to the tentative decisions, and (3) forming a final decision as to the data symbol values in response to signals including the replica. If desired, the final decisions can also be stored and fed back to the processor which forms the replica, so that the replica is a joint function of past final decisions and future tentative decisions regarding the data symbols represented by the signal samples. The present invention provides increased accuracy by using tentative decisions rather than input samples to form the non-linear distortion replica.

15 Claims, 5 Drawing Figures

$\theta(t)$: PHASE JITTER
$\alpha_2, \alpha_3$: LEVELS OF 2nd, 3rd ORDER NONLINEARITY

EQUALIZATION OF MODULATED DATA SIGNALS UTILIZING TENTATIVE AND FINAL DECISIONS AND REPLICATION OF NON-LINEAR CHANNEL DISTORTION

BACKGROUND OF THE INVENTION

1. Field of the Invention

The present invention relates generally to the processing of modulated data signals and, in particular, to equalization of such signals which have been transmitted over a channel which introduces both linear and non-linear distortion.

2. Description of the Prior Art

When high-speed data signals are transmitted over limited bandwidth, e.g., switched voiceband telephone transmission channels, various channel impairments give rise to distortion which in turn results in a phenomenon known as intersymbol interference. This phenomenon is a manifestation of the fact that a pulse passing through a distorted band-limited channel expands in the time domain. As a result, each sample of the received signal is not simply derived from a single transmitted data symbol but, rather, some combination of symbols. Impairments are caused by phase jitter, additive noise and non-flat frequency response in the channel, and result in amplitude and delay distortion which is often characterized as linear or non-linear.

Intersymbol interference which results from linear distortion is manifested in that each sample of the received signal contains a linear combination of a transmitted symbol which the sample nominally represents with symbols which precede and succeed it in the data stream. Known techniques which compensate for linear distortion in both baseband and passband have been quite successful, and include linear feedforward equalization and linear decision feedback equalization. In accordance with the former technique, each sample of the received signal is added to a weighted linear sum of past and future samples, prior to a decision being made as to the value of the transmitted symbol. In accordance with the latter technique, a weighted linear sum of past decisions is added to each sample, again prior to a decision being made as to the value of the transmitted symbol. See, for example, U.S. Pat. No. 3,974,449 issued to D. D. Falconer on Aug. 10, 1976.

Intersymbol interference caused by non-linear distortion (sometimes called "harmonic distortion") is manifested in that each sample of the received signal represents a combination of *products* of the current, past and future modulated data symbols, and/or the complex conjugates of such data symbols in systems that employ quadrature amplitude modulation (QAM). In transmission systems that employ linear modulation, such as QAM, the effect of non-linear distortion is to reduce the margin against noise. Indeed, for data rates above 4800 bps, which are needed in order to provide new services such as digitized encrypted speech, high-speed facsimile and high-speed dialed backup capability, non-linear distortion is an important impairment on many voiceband channels. Attempts to compensate for non-linear distortion, while somewhat successful, have nevertheless not been fully effective, for a variety of reasons. For example, the arrangement in U.S. Pat. No. 3,600,681 issued Aug. 17, 1971 to T. Arbuckle compensates for non-linear intersymbol interference *only* in baseband data signals. U.S. Pat. Nos. 4,213,095 and 4,181,888 issued to D. D. Falconer on July 15, 1980 and Jan. 1, 1980, respectively, describe separate techniques for feedforward and feedback non-linear equalization of modulated data signals. Even if the Falconer apparatus is combined to yield both feedforward and feedback non-linear equalization, the resulting arrangement, shown in FIG. 3(a) of an article by Falconer entitled "Adaptive Equalization of Channel Nonlinearities in QAM Data Transmission System" BSTJ, Vol. 57, pp. 2589–2611, (1978) is not well suited for economical, real-time practical implementation. First, the accuracy of the replica of channel nonlinearity ($\tilde{Y}_{NL}(n)$) that is constructed is impaired by the fact that the apparatus is driven by noisy and distorted received samples $R(n)$. Second, the number of registers needed to store the values of received samples $R(n)$ that are used in the calculation of each correction term is quite high. Third, the Falconer architecture requires that the same timing phase be used for both linear and nonlinear equalization, and such an arrangement may not be optimum. Finally, the prior art arrangement is not amenable to use as a "plug-in" or "add-on" to a conventional linear receiver (as found, for example in the AT&T 2096A data set) since error values formed using the decision output of the *non-linear* equalizer must be used to update the coefficients contained in the *linear* equalizer.

In view of the foregoing, it is the broad object of the present invention to provide a method and arrangement which compensates for non-linear distortion which occurs when a modulated data signal is transmitted via a limited bandwidth channel. Specific objects are to efficiently compensate for intersymbol interference by constructing an accurate replica of the channel nonlinearity, where the required calculations can be performed in real time without exceedingly complex hardware requirements. In addition, elimination of timing phase problems and compatibility of the present invention with commercially available linear processors are also desired.

SUMMARY OF THE INVENTION

The foregoing and additional objects are achieved in accordance with the principles of the present invention by apparatus and a technique for equalizing non-linear distortion in a received modulated data signal by (1) forming tentative decisions as to the values of data symbols represented by the signal typically by using a receiver including a conventional linear equalizer, (2) constructing a replica of the non-linear distortion in response to the tentative decisions, and (3) forming a final decision as to the data symbol values in response to signals including the replica. If desired, the final decisions can also be stored and fed back to the processor which forms the replica, so that the replica is a joint function of past final decisions and future tentative decisions regarding the data symbols represented by the signal samples. Because the present invention advantageously uses tentative decisions rather than input samples to form the non-linear distortion replica, increased accuracy is obtained. The tentative decisions which have discrete values can be stored more efficiently than analog values of the received samples. In addition, the arrangement of the instant invention can easily be used as a "plug-in" in conjunction with a conventional linearly equalized data receiver, since a separate error signal is used for updating the coefficients used for nonlinear equalization.

BRIEF DESCRIPTION OF THE DRAWING

The foregoing and additional features and advantages of the present invention will be more readily appreciated by consideration of the following detailed description when read in light of the drawing in which.

DETAILED DESCRIPTION

Figure 1:
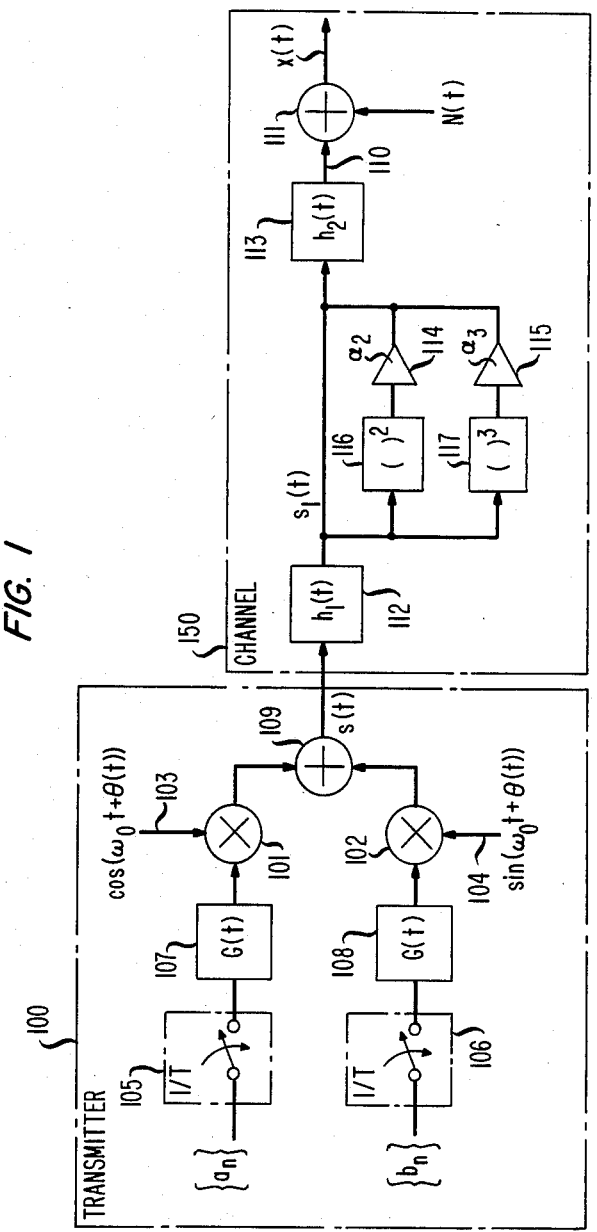
FIG. 1 is a block diagram mathematical model representation of a QAM transmitter and an example of a nonlinear transmission channel.

In order to understand the equalization technique of the present invention, it is first instructive to consider the characteristics of the QAM transmitter 100 and nonlinear channel 150 of FIG. 1 which produce the received modulated data signal, which is then processed in accordance with the present invention. Using complex signal notation, the transmitted signal s(t) on line 109 is given by $$s(t) = Re\left( e^{j\omega_o t} \sum_n \tilde{A}_n \tilde{G}(t - nT) \right) \quad (1)$$

where Re indicates the real part of the quantity in brackets, $\omega_o$ is the angular carrier frequency, $\tilde{A}_n = a_n + jb_n$ is the complex (in-phase and quadrature) sequence of transmitted digital data symbols, $\tilde{G}(t)$ is the complex impulse response of the transmitting filter, and $1/T$ is the symbol rate. For the sake of discussion, we let the real and imaginary parts of $\tilde{A}_n$ each take on one of the discrete values $\pm 1$, $\pm 3$ to result in the 16-point rectangular constellation in the two dimensional signal space although the invention will still be valid with arbitrary values of the data symbol, $\tilde{A}_n$.

As shown in FIG. 1, the transmitted signal s(t) is formed (at least conceptually) by applying the sequence $\{a_n\}$ and $\{b_n\}$ to modulators 101 and 102 which receives carrier inputs $\cos(\omega_o t + \theta(t))$ and $\sin(\omega_o t + \theta(t))$ on lines 103 and 104, respectively. The inputs are sampled at the symbol rates 1/T by switches 105, 106 and transmitting filters 107, 108 having an impulse response G(t) are interposed between each switch and its corresponding modulator. The in-phase and quadrature components are combined in adder 109 before application to a dispersive nonlinear transmission channel 150 which introduce additive noise N(t) on to the signal line 110 via adder 111 to yield the channel output signal. For convenience, phase jitter $\theta(t)$ has been modeled as entering the system at the transmitter as part of the carrier inputs 103 and 104. The receiver assumes that the phase jitter is constant over the duration of the impulse response $h_1(t)$ and $h_2(t)$ of the channel (as introduced by filters 112 and 113) and that the jitter varies slowly compared to the carrier radian frequency $\omega_o$.

With respect to channel distortion, the gain factors $\alpha_2$ and $\alpha_3$ of amplifiers 114 and 115 set the levels of the second and third harmonic, respectively, which are introduced by distortion "sources" 116 and 117, and dispersive filters 112 and 113 insure that the channel output signal X(t) is always properly bandlimited. This nonlinearity model, which is limited to the predominant second and third order terms, is quite reasonable in practice since the modulated signal is particularly sensitive to the third-order harmonic distortion which includes an interfering term centered at the carrier frequency. Even though the channel model of FIG. 1 introduces the nonlinearities in a memoryless fashion, the composite nonlinear channel can be characterized by the leading terms in a time-invariant Volterra series, which is a fairly general description of an arbitrary nonlinear system. Consequently, the compensation technique of the present invention is not limited to a particular channel model. The equation for the channel output signal, X(t), is similar to that derived by Falconer in the above cited BSTJ article, in equations 3(a-f). For purposes of nonlinear cancellation, it is convenient to have the corresponding analytic signal (which is the sum of the signal and $\sqrt{-1} = j$ times the Hilbert Transform of X(t) and has only positive frequency content) represented by:

$$\tilde{X}(t) = x(t) + j\tilde{x}(t) = \exp(j\Omega)\tilde{U}_{11}(t) + \exp(-j\Omega)\tilde{U}_{12}(t) + \exp(j3\Omega)\tilde{U}_3 + \tilde{U}_0(t) + \exp(j2\Omega)\tilde{U}_2(t) \quad (2a)$$

where $$\Omega = \omega_o t + \theta(t) \quad (2b)$$

and where the modulation terms are defined by $$\tilde{U}_{11}(t) = \sum_k \tilde{A}_k \tilde{F}(t - nT) + \alpha_2 \sum_k \sum_l \sum_m \tilde{A}_k \tilde{A}_l \tilde{A}_m^* \tilde{G}_{11}(t - kT, t - lT, t - mT) \quad (3)$$

$$\tilde{U}_{12}(t) = \alpha_3 \sum_k \sum_l \sum_m \tilde{A}_k^* \tilde{A}_l^* \tilde{A}_m \tilde{G}_{12}(t - kT, t - lT, T - mT) \quad (4)$$

$$\tilde{U}_3(t) = \alpha_3 \sum_k \sum_l \sum_m \tilde{A}_k \tilde{A}_l \tilde{A}_m \tilde{G}_3(t - kT, t - lT, t - mT) \quad (5)$$

$$\tilde{U}_0(t) = \alpha_2 \sum_k \sum_l \tilde{A}_k \tilde{A}_l^* \tilde{G}_0(t - kT, t - lT) \quad (6)$$

$$\tilde{U}_2(t) = \alpha_2 \sum_k \sum_l \tilde{A}_k \tilde{A}_l \tilde{G}_2(t - kT, t - lT) \quad (7)$$

The coefficients $\alpha_2$ and $\alpha_3$, respectively, set the levels of quadratic and cubic nonlinearities, and the expansion represents the first three terms in a general Volterra series representation of the response of an arbitrary nonlinear channel to a QAM input. Each term in the expansion is analytic having only positive frequency content. The combined complex impulse response of the transmitting filter and baseband equivalent of the passband channels $h_1(t)$ is denoted by $\tilde{F}(t)$. The terms $\tilde{G}_{11}$ through $\tilde{G}_2$ are the nonlinear distortion terms, and are due to the transmitting filter, the nonlinearities, and the channel response. The terms $\tilde{U}_0(t)$ and $\tilde{U}_2(t)$ comprise the second-order nonlinearity, while $\tilde{U}_{12}(t)$, $\tilde{U}_3(t)$ and the second term of $\tilde{U}_{11}(t)$ comprise the cubic nonlinearities. The first term in $\tilde{U}_{11}(t)$ is the linearly-distorted signal, and may be compensated for by conventional linear equalization. The complex filtered noise denoted by N(t) is assumed to be added after the distortion.

It should be noted here that, in reality, most channels having moderate or severe levels of harmonic distortion would be more appropriately modeled by a cascade of two nonlinear sections, because the actual sources of nonlinearity are distributed at various points along the entire signal path. Thus, it is desirable that any nonlinear compensation technique be able to mitigate the distortion produced by such a channel.

In practice, harmonic distortion is measured and specified using the four-tone method described in *Bell System Data Communications Technical Reference,* "Transmission Parameters Affecting Voiceband Data Transmission", PSB 41008, July 1974. Analysis of the relationship between the measured distortion levels and the sizes of $\alpha_2$ and $\alpha_3$ reveals that these coefficients are related to the signal-to-nonlinearity ratios, and critically depend on the input signal power. Experimental evidence suggests that in order to provide private-line services at 9.6 kb/s, the C message weighted signal-to-noise ratio and the second and third order harmonic distortion must be maintained at limits of 28 dB, 35 dB and 40 dB, respectively. Such severe requirements, which arise when a 16 point multilevel signaling format (Quadrature Amplitude Modulation) is used without any compensation for harmonic impairments, are based on the fact that achievement of an error rate of $10^{-6}$ requires a signal-to-noise ratio (SNR) of approximately 21 dB. For severe private-line slop distortion, a C-message weighted received SNR of 28 dB can be translated into an unweighted SNR as low as 24 dB. Thus at the above limits, there is not much margin for the signal to be degraded by linear—let along nonlinear—distortion. It is also known that worst-case private-line linear distortion can degrade the received SNR by an additional 2 to 5 dB, so that the output SNR will be degraded to near the required value of 21 dB. It is clear then, that provision of 9.6 kb/s service on the DDD network, where more severe linear and nonlinear impairments are encountered, will be more readily achievable if an effective means of controlling nonlinear distortion can be found.

In accordance with the present invention, a signal processing technique that is capable of substantially mitigating the effects of harmonic distortion, which thus facilitates reliable 9.6 kb/s transmission on DDD facilities at, or near levels of 27 dB and 32 dB, respectively, for second and third order harmonic distortion has been developed. This invention will also facilitate reliable transmission, on leased facilities, at data rates exceeding 9.6 kb/s. The philosophy employed to mitigate the effects of harmonic distortion, generally speaking, is to cancel the nonlinear distortion by adaptively constructing, via a Volterra series representation, a replica of the interfering signal. The Volterra expansion is a general representation of the output of a nonlinear system; since it can accommodate almost any nonlinear system, the compensation can be provided independent of the specific model used for the nonlinear impairments and the channel model. It differs significantly from the earlier work of Falconer in that the nonlinear canceler has as its input *tentative decisions* provided by a linear equalizer, as opposed to using the received analog samples as the canceler input. The output of the nonlinear canceler is subtracted from an appropriately delayed sample of the equalizer output to provide the actual output prior to slicing. This arrangement advantageously offers both performance improvement and complexity reduction relative to Falconer's structure.

In order to compensate for harmonic distortion in a received modulated data signal of the type output from channel 150 shown in FIG. 1, the receiver of the present invention is arranged to utilize an engineering approximation to an (optimum) maximum-likelihood receiver, since an "ideal" receiver would require a complex sophisticated signal-processing algorithm whose economic realization is presently beyond the capability of current technology. The approximation is based on a straightforward and intuitively appealing suboptimum receiver which recovers continuous-valued data symbols which are subsequently quantized to the actual discrete data levels.

Figure 2:
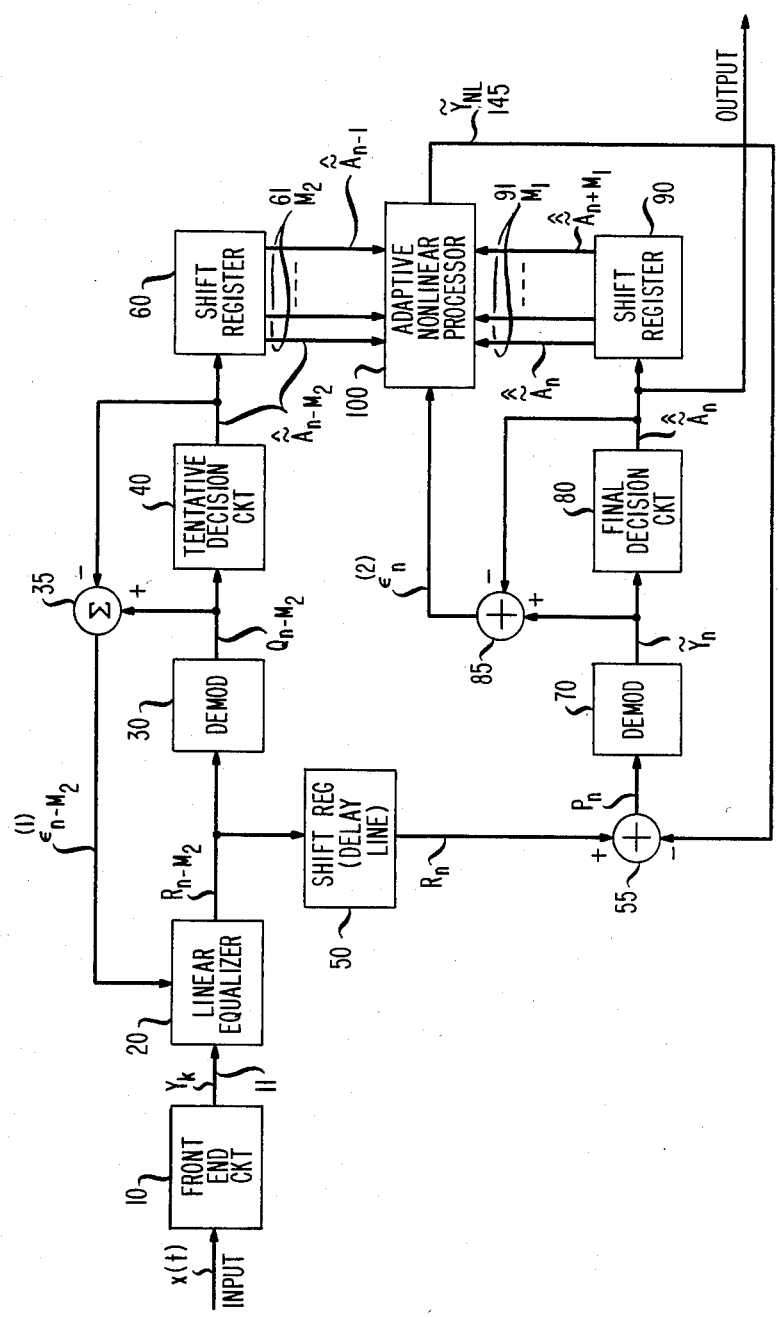
FIG. 2 is a block diagram of a passband receiver including a nonlinear processor, as arranged in accordance with the present invention.

One embodiment of a receiver incorporating the principles of the present invention shown in block diagram form in FIG. 2. It differs from the arrangement described by Falconer in that the nonlinear canceler works with the equalized and quantized outputs $\tilde{A}_n$, i.e., the tentative decisions. The present invention can make use of either a linear fractionally-spaced equalizer or a symbol spaced equalizer. With this arrangement, tentative decisions are used to adaptively construct a replica of the nonlinear distortion, $\tilde{Y}_{NL}$, which is then subtracted from the delayed equalized output. Previous final decisions $\tilde{\tilde{A}}_n$, are also used, in a decision-feedback sense, to construct the replica signal. After subtraction, the resulting signal is quantized to provide the final decision on the data. It is important to note that the canceler liearly processes a nonlinear function of the tentative decisions.

The equations describing the function of the nonlinear processor of FIG. 2 are similar to those of Falconer's nonlinear processor. Analytic, or complex, signal notation is used, as this provides the most compact description of the system operation. Referring again to FIG. 2, $\tilde{Y}(n)$ is the demodulated final (complex) output of the demodulator 70 at sample time nT, and $\tilde{Y}_{NL}(n)$ is the output of nonlinear processor 100 at the same instant. The demodulated output $\tilde{Y}(n)$ at t=nT is given by $$\tilde{Y}(n) = \exp[-j(\omega_o nT + \theta_n)](\tilde{R}(n) - \tilde{Y}_{NL}(n)) \qquad (8)$$

where $\theta_n$ is the phase jitter estimate and R(n) is the passband output of linear equalizer 20 after a delay introduced in shift register 50. The nonlinear processor 100 passband output $Y_{NL}$ has 5 terms designated $Y_{NL1}$ through $Y_{NL5}$ and is given by $$\tilde{Y}_{NL}(n) = \qquad (9)$$

$$\exp(j\Omega_n) \sum_k \sum_l \sum_m \tilde{B}^{11}_{klm} \tilde{A}(n-k)\tilde{A}(n-l)\tilde{A}(n-m)[\equiv \tilde{Y}_{NL1}] +$$

$$\exp(-j\Omega_n) \sum_k \sum_l \sum_m \tilde{B}^{12}_{klm} \tilde{A}(n-k)\tilde{A}(n-l)\tilde{A}(n-m)[\equiv \tilde{Y}_{NL2}] +$$

$$\exp(j3\Omega_n) \sum_k \sum_l \sum_m \tilde{B}^{3}_{klm} \tilde{A}(n-k)\tilde{A}(n-l)\tilde{A}(n-m)[\equiv \tilde{Y}_{NL3}] +$$

$$\sum_k \sum_l \tilde{B}^{0}_{kl} \tilde{A}(n-k)\tilde{A}(n-l)[\equiv \tilde{Y}_{NL4}] +$$

$$\exp(j2\Omega_n) \sum_k \sum_l \tilde{B}^{2}_{kl} \tilde{A}(n-k)\tilde{A}(n-l)[\equiv \tilde{Y}_{NL5}]$$

In equation (8), $\Omega_n = \omega_o nT + \theta_n$ is the estimated demodulator phase provided by the linear-receiver's carrier recovery loop. The complex coefficients $$\tilde{B}^{11}_{klm}, \tilde{B}^{12}_{klm}, \tilde{B}^{3}_{klm} \text{ and } \tilde{B}^{0}_{kl}, \tilde{B}^{2}_{kl}$$

are respectively, the cubic and quadratic tap weights, the values of which are given below. When $M_1$ final and $M_2$ tentative decisions are used to construct the nonlinear replica, the indices k, l, and m run from one to $M_1 + M_2 = M$. In these summations the first $M_1$ terms involve prior final decisions, $\hat{A}_n$, while the remaining terms involve the tentative decisions, $\tilde{A}_n$. To get a feel for the complexity of the cancellation operation—apart from adaptation considerations—it is noted that to compute one output sample there are $2M^2$ and $3M^3$ quadratic and cubic terms, respectively. These terms directly correspond to the number of (complex) multiplications which must be performed. It is also to be noted that the replica signal contains terms at DC as well as $2\hat{\Omega}_n$ and $3\hat{\Omega}_n$ type terms.

In FIG. 2, the received line signal x(t) is processed first by a front end circuit 10 which includes conventional bandpass filters, automatic-gain control, a phase splitter and an analog-to-digital converter (ADC). The phase splitter and ADC produces a complex pair of passband line samples $Y_k$ on line 11. For QAM, $Y_k$ is a complex signal with real (in-phase) and imaginary (quadrature) components.

Samples $Y_k$ on line 11 are applied to a processor 20, which normally comprises a passband adaptive linear equalizer. This processor can be either symbol-spaced (in which case the subscript k in $Y_k$ corresponds to the data symbols) or fractionally-spaced (in which case there is more than one sample $Y_k$ per symbol). Examples of symbol-spaced and fractionally-spaced equalizers are contained in *Principles of Data Communication*, McGraw-Hill, New York, 1968, R. W. Lucky, J. Salz and E. J. Weldon, Jr.; and *The Bell System Technical Journal*, Vol. 60, No. 2, February 1981, "Fractionally-Spaced Equalization: An Improved Digital Transversal Equalizer," by R. D. Gitlin and S. B. Weinstein.

The output of processor 20, designated as $R_{n-M_2}$, passes into both a shift register 50 (which may be a simple delay line) and a demodulator 30. Here, subscript n denotes the current sample, while M is the number of sample delay introduced by the register 50. The purpose of register 50 is to provide sufficient delay to match the delay incurred by the nonlinear processor 100, to be described more fully below. Demodulator 30 translates the passband samples $R_{n-M_2}$ to the corresponding baseband signal $Q_{n-M_2}$. This operation is normally performed by a carrier recovery circuit, for example of the type described in *The Bell System Technical Journal*, Vol. 55, No. 3, March 1976, "Jointly Adaptive Equalization and Carrier Recovery in Two-Dimensional Digital Communications Systems," pp. 317-334 by D. D. Falconer.

Baseband samples $Q_{n-M_2}$ are then applied to a tentative decision circuit 40, which thresholds $Q_{n-M_2}$ to tentative data values $\hat{A}_{n-M_2}$ which have both real and imaginary parts. Typically, the decisions can take on values of $\pm 1$ and $\pm 3$. In addition, $Q_{n-M_2}$ is compared in summing circuit 35 with the tentative decisions $\hat{A}_{n-M_2}$ to form an error signal $$\epsilon^{(1)}_{n-M_2}$$

which is used to update the adaptive filter coefficients in processor 20 described earlier.

$M_2$ tentative decisions $\hat{A}_{n-M_2}$ to $\hat{A}_n$ are stored in a shift register 60, which like register 50, basically functions as a first-in first-out (FIFO) device. Samples are entered in register 60 serially, but all $M_2$ stored samples must be accessible in parallel on lines 61. A third shift register 90 of similar configuration stored $M_1$ final decisions $\hat{A}_{n+1}$ to $\hat{A}_{n+M_1}$, generated by a final decision circuit 80 described below and makes these values simultaneously available on lines 91. Data in both shift registers 60 and 90 are used by the adaptive nonlinear canceller 100 to reconstruct the nonlinear intersymbol interference estimate $\tilde{Y}_{NL}$ on line 145.

The nonlinear intersymbol interference estmate $\tilde{Y}_{NL}$ is subtracted from from the sample $R_n$ output from register 50 using summer circuit 55 to produce the sample $P_n$. The latter is applied to demodulator 70 to shift the signal to baseband before final thresholding by final decision circuit 80. The values used in demodulator 70 can, for convenience, be delayed versions of those used by demodulator 30, described earlier.

Final decision circuit 80 produces the final complex output signal $\hat{A}_n$, where both the real and imaginary parts typically take on values $\pm 1$, $\pm 3$ in the rectangular QAM constellation. The demodulated output $\tilde{Y}_n$ of demodulator 70 and final decisions $\hat{A}_n$ are also applied to a summer 85 to generate a difference (error signal) $\epsilon_n^{(2)}$ used for updating the coefficients in nonlinear canceller 100.

Inspection of the passband nonlinear processor arrangement of FIG. 2 reveals that a conventional receiver comprising front end circuit 10, processor 20, demodulator 30, tentative decision circuit 40 and summer 35 is used to form tentative decisions $\hat{A}_{n-M_2}$. Such a receiver is commercially available, as for example, the model 2096A data set sold by AT&T, and equalized samples $R_{n-M_2}$ are typically available as an output from such receivers. By virtue of this arrangement, the present invention can be used as an "add-on" circuit.

Figure 3:
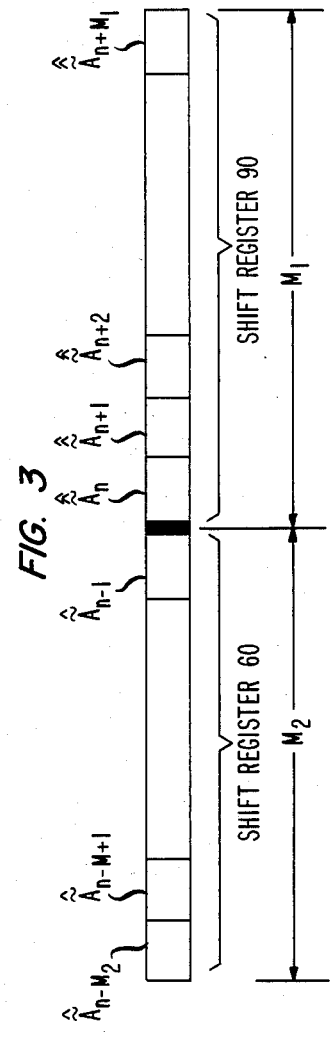
FIG. 3 is a diagram illustrating the relative timing of tentative and final decisions used in formation of the non-linear distortion estimate of the present invention.

FIG. 3 graphically depicts the temporal alignment of $M_2$ tentative and $M_1$ final decisions used to form the nonlinear distortion estimate $\tilde{Y}_{NL}$ in processor 100. As shown, the sample values in shift register 60 represent a set of $M_2$ tentative decisions labeled $\hat{A}_{n+M_2}$ to $\hat{A}_n$, while the sample values in register 90 repreent a set of $M_1$ final decisions labeled $\hat{A}_{n+1}$ through $\hat{A}_{n-M_1}$. The size of both sets $M_1$ and $M_2$ can be varied as desired, as long as register 50 provides suitable delay to insure that the inputs to summer 55 correspond in time. The sum of $M_1$ and $M_2$ is denoted by the variable M.

Figure 4:
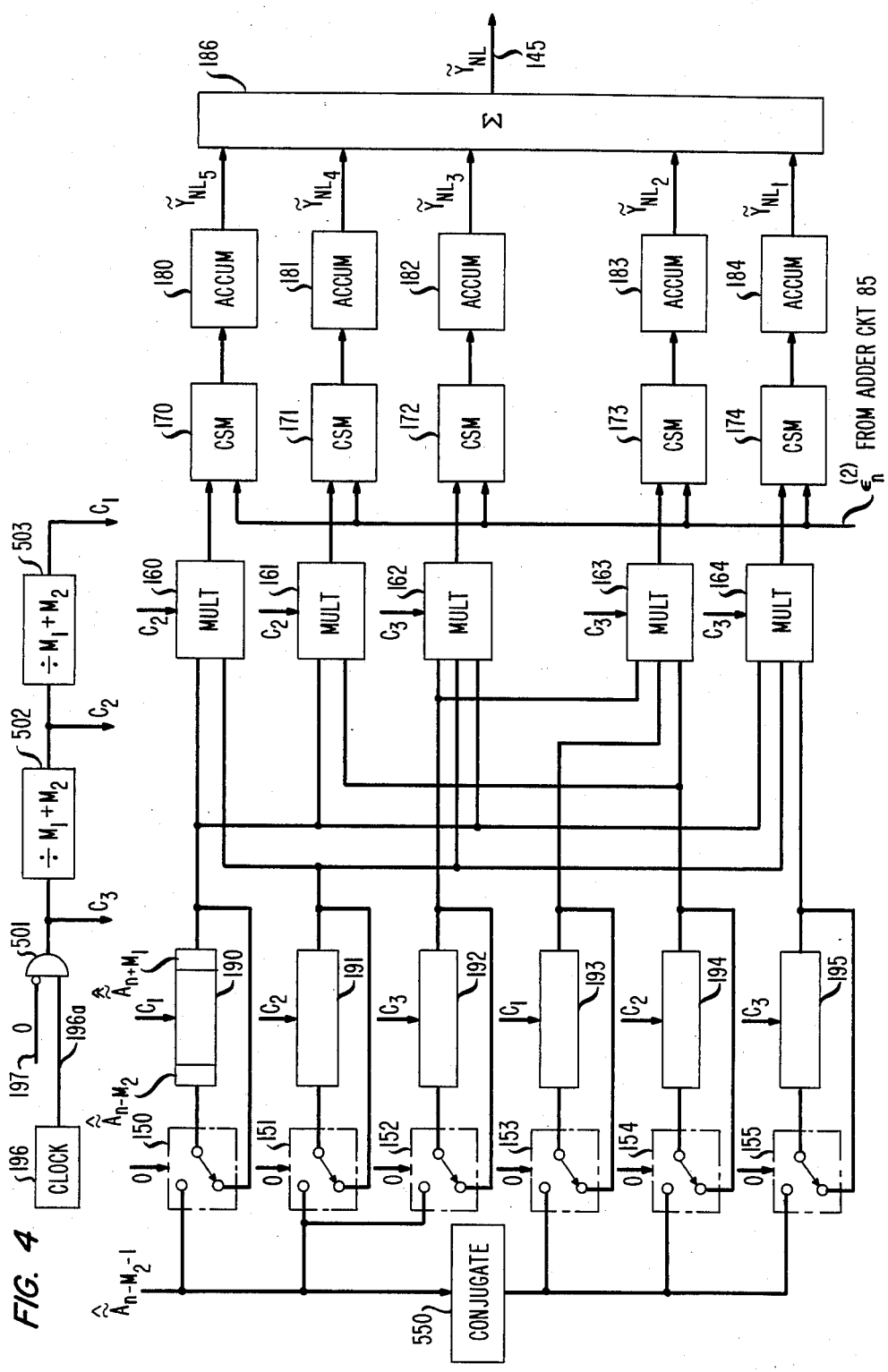
FIG. 4 is a detailed block diagram of the adaptive non-linear processor 100 shown in FIG. 2.

Attention is now directed to FIG. 4 which shows an illustrative embodiment of adaptive nonlinear processor 100 of FIG. 2. Processor 100 implements computations of the nonlinear distortion term $\tilde{Y}_{NL}$, as given in Eq. (9) above.

Processor 100 includes multiplexer switches 150-155, complex multipliers 160-164, coefficient store and multiplier (CSM) units 170-174 and accumulators 180-184, and M position shift registers 190-194. During each sampling period, the serially connected chain of multiplexer switch 150, register 190, multiplier 160 and CSM unit 170 generates the modulated weighted products of the fifth term $\tilde{Y}_{NL5}$ of signal $\tilde{Y}_{NL}$ and stores the result in accumulator 180. The products needed to compute the fourth through first terms $\tilde{Y}_{NL4}$ through $\tilde{Y}_{NL1}$ in Eq. (9) are generated, modulated, weighted and stored similarly, each by its own multiplexer-register-multiplier-CSM unit-accumulator chain. Since the chains which begin with multiplexers 150 and 151 generate terms of signal $Y_{NL}$ have two multiplicand decision/conjugate products, i.e., terms $\tilde{Y}_{NL5}$ and $\tilde{Y}_{NL4}$, outputs from these registers are extended to two-input complex multipliers 161 and 164, respectively. Outputs from three registers are extended to multipliers 162, 163 and 165, respectively, in order to generate the three-multiplicand decision/conjugate products which make up terms $\tilde{Y}_{NL3}$, $\tilde{Y}_{NL2}$ and $\tilde{Y}_{NL1}$.

After terms $\tilde{Y}_{NL1}$ through $\tilde{Y}_{NL5}$ have all been stored in their respective accumulators, they are added together in adder 186 to generate the nonlinear distortion estimate $\tilde{Y}_{NL}$ on lead 145.

Processor 100 of FIG. 4 operates under the control of a clock 196, which must have an output frequency sufficient to insure that the generation of signal $\tilde{Y}_{NL}$ is completed during a single sampling interval T as described in further detail below. If the baud interval is ~400 μsec for 2400 baud operation, then the output of clock 196 must operate at $2400 \times M^3$ Hz or faster.

The clock pulses available on output lead 196a of clock 191 are applied to a first input to AND gate 501. The second input to gate 501 is a baud rate clock $\phi$ on line 197, which is applied via an inverter 198. When $\phi$ is low during the interval between successive samples, AND gate 501 is thus enabled to pass the output of clock 196 to line 199.

The serial bit streams representing data decisions, both tentative and final are shifted through registers 190–195 under control of the clock signal, designated $C_3$, on line 199, and two other clock signals, $C_2$ and $C_1$ which are derived from clock $C_3$. At the beginning of each sampling period, the baud rate clock pulse $\phi$ is used to enter the current tentative value $\tilde{A}_{n-M}$ output from tentative decision circuit 40 of FIG. 3 into the first position within the three shift registers 190–192, via multiplexer switches 150–152, respectively. Concurrently, the complex conjugate of the current tentative value is computed in a conjugation circuit 550, and applied to the first positions the remaining three shift registers 193–195, via multiplexer switches 153–155, respectively. The other $M-1$ positions in registers 190–195 were previously filled with the tentative and final values $\tilde{A}_{n-A+1}$ to $\tilde{A}_{n+N}$, in the order illustrated in FIG. 3.

During the time interval between successive baud rate clock pulses, switches 150–155 are repositioned so that the output of each shift register (i.e., the contents of the $M^{th}$ or final shift register position) is connected to its input. The contents in each of the register positions is then shifted to the right at a rate determined by clock pulses $C_1$, $C_2$ and $C_3$. As illustrated in FIG. 4, the $C_3$ clock output from gate 501 is used to shift data stored in registers 192 and 195. Clock $C_2$ is derived from clock $C_3$ by applying the output of AND gate 501 to a first divide by M circuit 502, and this clock is used to shift the contents of registers 191 and 194. Clock $C_1$ is derived by applying the output of divider circuit 502 to a similar divide by M circuit 503. $C_1$ clock pulses are used to shift the M values in registers 190 and 193 one position to the right.

Still referring to FIG. 4, the outputs of registers 190 and 191, (i.e., the values stored in the $M^{th}$ positions of the respective registers) are applied to complex multiplier 160, while multiplier 161 receives inputs from registers 190 and 194. These multipliers each receive two inputs because the terms $\tilde{Y}_{NL5}$ and $\tilde{Y}_{NL4}$ each consist of the product of two values. On the other hand, multipliers 162–164 each receive three inputs which are used to form the remaining terms $\tilde{Y}_{NL3}$, $\tilde{Y}_{NL2}$ and $\tilde{Y}_{NL1}$ of $\tilde{Y}_{NL}$; multiplier 162 receives its inputs from registers 192, 193 and 194 and multiplier 164 receives its inputs from registers 190, 191 and 195.

By virtue of the foregoing register and clocking arrangement, multiplier 160 forms the products of $\tilde{A}_{n+M1}$ and $\tilde{A}_{n+M1}$ through $\tilde{A}_{n-M2}$ during the interval between the first and second $C_1$ clock pulses in each baud interval; during this period, $C_2$ clock pulses advance the data in register 191 by a total of M times so that each stored value is in turn applied to multiplier 160. These products are modulated in multiplier 160 by the appropriate carrier frequency (i.e., exp $(\alpha 2\Omega_n)$ and scaled by the appropriate coefficients in CSM circuit 170 and accumulated, in a manner to be described below. When the next $c_1$ clock pulse shifts the contents of register 190 one position to the right, the products of $\tilde{A}_{n-M2+1}$ and $\tilde{A}_{n+M1}$ through $\tilde{A}_{n-M2}$ are likewise formed, modulated, scaled and accumulated. After the occurrence of M pulses of clock $C_1$, all of the modulated products needed to yield $\tilde{Y}_{NL5}$ have been formed. This procedure in effect cycles the indices l and k in equation (9) from 1 to M by first selecting l=1 and then advancing k as each integer between 1 and M; the value of l is then incremented by 1, and the procedure repeated until =M.

Multiplier 161 forms the products of the values stored in registers 190 and 194 in a manner similar to that just described. These products are scaled in CSM circuit 171 and accumulated to yield $\tilde{Y}_{NL4}$.

The remaining terms of $\tilde{Y}_{NL}$ which have three product components are formed in multipliers 162–164. Multiplier 162, as an example, receives inputs from registers 190, 191 and 192, the contents of which are advanced in response to clock pulses $C_2$ and $C_3$, respectively. During the interval between the first and second $C_2$ clock pulses in each baud interval, the $C_3$ clock advances the M values stored in register 192 so that products $\tilde{A}_{n+M-1} \times \tilde{A}_{n+M1} \times (\tilde{A}_{n-M2}$ through $\tilde{A}_{n+M1})$ are formed. During the next $C_2$ clock interval the products $\tilde{A}_{n+M-1} \times \tilde{A}_{n+M1-1} \times (\tilde{A}_{n-M2}$ through $\tilde{A}_{n+M1})$ are formed, and this process is repeated a total of M times until the next $C_1$ clock pulse. The contents of register $C_1$ are then shifted by one position and the foregoing process repeated. Thus, when $C_1$ has advanced M times, $C_2$ will have cycled $M^2$ times and $C_3$ will have cycled $M^3$ times; at this point, all of the products required in equation (9) have been formed for the present symbol interval. The products formed in multiplier 162 are modulated by the third harmonic exp $(j3\Omega_n)$ of the carrier frequency advantageously by multiplication by the appropriate coefficients. Likewise, multipliers 163 and 164 provide for modulation of the formed products by exp $(=j\Omega_n)$ and exp $(j\Omega_n)$, respectively.

Because multipliers 160 and 161 form products of two data symbol values per interval while multipliers 162–164 form products with three terms, appropriate clock signals must be extended to the multipliers to control the multiplication. For this purpose, the $C_2$ clock output from divider circuit 502 is extended to multipliers 160 and 161, while the $C_3$ clock is extended to multipliers 162–164.

Since the nonlinear canceller output, as given by Eq. (9), performs a *linear* operation on the nonlinear combinations of the (presumed correct) tentative data decisions, the mean squared-error will be a unimodal function of the canceller tap weights. Thus, the nonlinear taps in Eq. (9) can be adjusted recursively, utilizing stochastic-gradient algorithms which minimize the overall instantaneous squared error $|\tilde{\epsilon}^{(2)}(n)|^2$. Note that the nonlinear processor does not have to estimate the phase jitter, since this is done by the linear receiver including processor 20. The recursive coefficient updating equations are as follows:

$$\tilde{B}^{11}_{klm}(n + 1) = \tilde{B}^{11}_{klm}(n) + \gamma_{11} \epsilon^{(2)}_n \tilde{A}(n - k) \quad (10)$$
$$\tilde{A}(n - l)\tilde{A}(n - m)\exp(j\hat{\Omega}_n)$$

$$\tilde{B}^{12}_{klm}(n + 1) = \tilde{B}^{12}_{klm}(n + 1) + \gamma_{12} \epsilon^{(2)}_n \tilde{A}(n - k) \quad (11)$$
$$\tilde{A}(n - l)\tilde{A}(n - m)\exp(-j\hat{\Omega}_n)$$

$$\tilde{B}^{3}_{klm}(n + 1) = \tilde{B}^{3}_{klm}(n) + \gamma_{3} \epsilon^{(2)}_n \tilde{A}(n - k) \quad (12)$$
$$\tilde{A}(n - l)\tilde{A}(n - m)\exp(-j3\hat{\Omega}_n)$$

$$\tilde{B}^{0}_{kl}(n + 1) = \tilde{B}^{0}_{kl}(n) + \gamma_{o} \epsilon^{(2)}_n \tilde{A}(n - k)\tilde{A}(n - l) \quad (13)$$

$$\tilde{B}^{2}_{kl}(n + 1) = \tilde{B}^{2}_{kl}(n) + \gamma_{2} \epsilon^{(2)}_n \tilde{A}(n - k)\tilde{A}(n - l) \quad (14)$$

Figure 5:
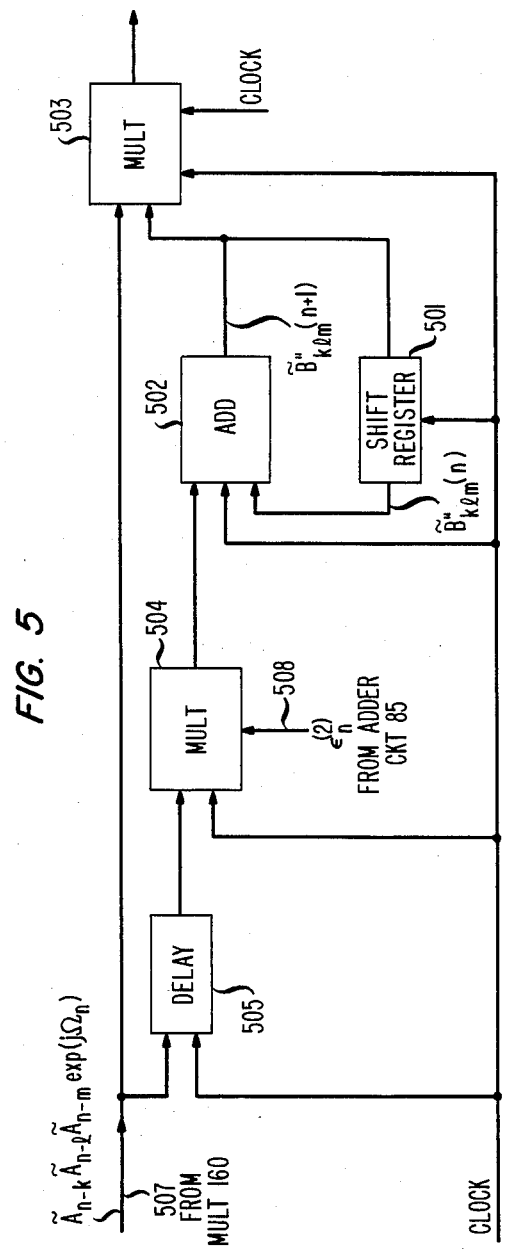
FIG. 5 is a block diagram of a coefficient store and multiplier (CSM) circuit within the processor of FIG. 4.

FIG. 5 illustrates circuitry used in one implementation of CSM unit 170; CSM units 171-174 may be constructed similarly. The arrangement shown is patterned after the arrangement depicted in FIG. 4 of the above-cited Falconer U.S. Pat. No. 4,181,888, and the accompanying description, which is applicable in the instant case, is incorporated herein by reference.

As shown in FIG. 5, the coefficient value $$\tilde{B}^{11}_{klm}(n)$$

for the current sample interval is stored in a shift register 501 and applied to one input of adder circuit 502 in order to form an updated version of the same coefficient $$\tilde{B}^{11}_{klm}(n + 1)$$

which is then applied to register 501 and one input of multiplier 503. The correction term (from Eq. (10)) added to the existing coefficient to obtain the new coefficient is provided by multiplying the output from multiplier 160 of FIG. 4 on line 507 by the error $\epsilon_n^{(2)}$ obtained from adder circuit 85 of FIG. 2 using multiplier 504. A delay circuit 505 precedes multiplier 504 in order to compensate for the delay introduced in register 501 and thus assure that the corresponding coefficient and sample products are simultaneously applied to multiplier 503. Multiplier 504, the output of which provides the second input of adder circuit 502, also scales the correction term by the scaling factor $\gamma_{11}$, discussed below. Appropriate timing for the various elements in the CSM circuit are provided by clock inputs received via line 506; timing details are provided in the above-mentioned Falconer reference and will be readily implemented by those skilled in the art.

With the arrangement of FIG. 5, the output of multiplier 503 is a series product needed to form the summation specified as $\tilde{Y}_{NL5}$ in Eq. (9). Similar arrangements implement CSM units 171-174 and provide product, terms for $\tilde{Y}_{NL1}$ through $\tilde{Y}_{NL4}$ which together constitute the non-linear distortion estimate $\tilde{Y}_{NL}$.

As with the feedback non-linear equalizer of Falconer, the step sizes $\gamma_0, \ldots \gamma_3$ have to be chosen for reasonably fast convergence, without causing instability, and also to provide a small residual mean-squared error. It is expected that the step sizes should be smaller than the inverse of the number of adaptive coefficients and the power of the (nonlinear) data terms being linearly combined. Thus, with a received average signal power of 10, $\gamma_0$ and $\gamma_2$ should be in the order of $10^{-5}$ to $10^{-6}$ and $\gamma_{11}$, $\gamma_{12}$, and $\gamma_3$ should be about $10^{-7}$.

It is possible that, with a large value of M, the numerous nonlinear taps (especially the cubic coefficients) would introduce self-noise because of imperfect adaptation. For example, if only the second order nonlinearity is present and the cubic coefficients are allowed to adapt, then the third order nonlinear processor output would be a hindrance to the adaptation of the second-order taps. It might be desirable during startup, to send a probing signal which, via appropriate filtering, determines the presence (or absence) of harmonic content, and then to insert the appropriate harmonic compensator. A dotting signal would appear to suffice for this task.

Several computational simplifications for the non-linear distortion estimate may be considered if a reduction in circuit complexity is more significant than any corresponding reduction in error rate. First, it is seen from Eq. (9) that of the three cubic terms, only one ($\tilde{Y}_{NL1}$) is directly inside the frequency band of interest, while the other two terms ($\tilde{Y}_{NL2}$ and $\tilde{Y}_{NL3}$) are centered at frequencies of $-\omega_0$ and $3\omega_0$, respectively. It is reasonable to assume that the latter two terms would be smaller than $\tilde{Y}_{NL1}$ and that these terms can thus be neglected. Simulations have confirmed this assumption.

Second, it is noted from Eq. (9) that the k and l indices can be interchanged for $$\tilde{B}^{11}_{klm}, \tilde{B}^{12}_{klm} \text{ and } \tilde{B}^{2}_{kl}.$$

This symmetry can be used to reduce the multiplications by almost a half for each of these terms. For example, by symmetry, $$\sum_{k}^{M} \sum_{l}^{M} \sum_{m=1}^{M} \tilde{B}^{11}_{klm}\hat{A}(n - k)\hat{A}(n - l)\hat{A}(n - m) = \quad (15)$$

$$\sum_{k}^{M} \sum_{l=1}^{M} \tilde{B}^{11}_{kk l}\hat{A}(n - k)\hat{A}(n - k)\hat{A}(n - l) +$$

$$\sum_{k=1}^{M-1} \sum_{l=k+1}^{M} \sum_{m=1}^{M} \tilde{B}^{11}_{klm}\hat{A}(n - k)\hat{A}(n - l)\hat{A}(n - m),$$

which consists of only $M^2(M+1)/2$ terms, as opposed to $M^3$ terms. Similarly, there are only $M(M+1)(M+2)/6$ terms for $$\tilde{B}^{3}_{klm}$$

because the k, l and m indices can be interchanged.

Third, it should be noted that all the data-product terms such as $\{\tilde{A}_k\tilde{A}_l\tilde{A}_m\}$, need not be calculated (or looked up in a ROM) at every iteration. Only those terms involving the new (incoming) tentative and final decisions are required while the others can be stored and shifted, i.e., $$\tilde{A}_k \tilde{A}_l \tilde{A}_m$$

can be shifted to become $$\tilde{A}_{k+1} \tilde{A}_{l+1} \tilde{A}_{m+1}$$

Various modifications and adaptations of the present invention will be apparent to those skilled in the art. Accordingly, it is intended that the invention be limited only by the appended claims. For example, it should be readily apparent that microprocessor circuitry can be used to form the various products needed in the nonlinear canceller in a manner such that circuitry is shared in an optimum way. Multiplications required in the apparatus can be performed by look-up tables rather than multipliers if desired. Various arrangements that would alter the clocking functions shown in the drawings will also be apparent to those skilled in the art.

What is claimed is:

1. Apparatus for processing received samples of a modulated data signal representing a stream of data symbols, comprising
    means responsive to said received samples for forming a first set of decisions as to the values of said data symbols,
    means for forming a replica of non-linear distortion in said data signal in response to a weighted sum of the products of the values of decisions in said first set, and
    means responsive to signals including said replica for forming final decisions as to the values of said data symbols.

2. The apparatus defined in claim 1 wherein said replica forming means is jointly responsive to decisions in said first set and a second set of final decisions for previously processed data symbols.

3. Apparatus for processing received samples of a modulated data signal representing a stream of data symbols, comprising
    means responsive to said received samples for forming a first set of decisions as to the values of said data symbols,
    means for forming a replica of non-linear distortion in said data signal in response to decisions in said first set, and
    means responsive to signals including said replica for forming final decisions as to the values of said data symbols,
    wherein said replica forming means is jointly responsive to decisions in said first set and a second set of final decisions for previously processed data symbols, and
    wherein said first set of decisions includes $M_2$ values $A_{n-M_2}$ to $A_{n-1}$, said second set of decisions includes $M_1$ values $\mathring{A}_n$ to $\mathring{A}_{n+m_1}$, and said non-linear distortion replica is a weighted sum of the products of selected combinations of said $M=M_1+M_2$ values on the complex conjugates thereof.

4. The apparatus defined in claim 3 wherein said non-linear replica is given by $$\tilde{Y}_{NL}(n) = \exp(j\hat{\Omega}_n) \sum_k \sum_l \sum_m \tilde{B}^{11}_{klm} \tilde{A}(n-k) \tilde{A}(n-l) \tilde{A}(n-m) +$$

-continued $$\exp(-j\hat{\Omega}_n) \sum_k \sum_l \sum_m \tilde{B}^{12}_{klm} \tilde{A}(n-k) \tilde{A}(n-l) \tilde{A}(n-m) +$$

$$\exp(j3\hat{\Omega}_n) \sum_k \sum_l \sum_m \tilde{B}^{3}_{klm} \tilde{A}(n-k) \tilde{A}(n-l) \tilde{A}(n-m) +$$

$$\sum_k \sum_l \tilde{B}^{0}_{kl} \tilde{A}(n-k) \tilde{A}(n-l) +$$

$$\exp(j2\hat{\Omega}_n) \sum_k \sum_l \tilde{B}^{2}_{kl} \tilde{A}(n-k) \tilde{A}(n-l)$$

where k, l and m are indices that run from 1 to M, $$\tilde{B}^{11}_{klm}, \tilde{B}^{12}_{klm}, \tilde{B}^{3}_{klm}, \tilde{B}^{0}_{kl} \text{ and } \tilde{B}^{2}_{kl}$$

are recursively updated tap weights, and $\hat{\Omega}_n$ is an estimate of the phase of samples in said first decision set.

5. Apparatus for providing non-linear equalization of samples of a received modulated data signal in order to form final decisions as to the values of data symbols represented thereby including:
    first means including a linear equalizer for forming tentative decisions as to the values of said data symbols,
    second means for forming a replica of the non-linear distortion in said modulated data signal in response to said tentative decisions,
    third means for forming a data recovery signal by eliminating distortion represented by said replica from a linearly equalized version of said received data signal, and
    means for forming said final decisions by quantizing a demodulated version of said data recovery signal.

6. The apparatus defined in claim 5 wherein said second means is jointly responsive to said tentative decisions and previous ones of said final decisions.

7. Apparatus for recovering the values of data symbols corresponding to a series of received samples of a modulated data signal, said apparatus including
    (a) first means including a linear equalizer for adaptively generating an initial estimate of the values of each of a first plurality of data symbols jointly in response to (1) a plurality of previously received samples and (2) the error values associated with the previously estimated symbol values corresponding to said previous samples, and
    (b) second means including a non-linear canceller for adaptively generating a final estimate of the values of each of said data symbols jointly in response to (1) said initial estimated values of said first plurality of data symbols, and (2) the finally estimated values of a second plurality of data symbols previously output from said apparatus.

8. The apparatus defined in claim 7 wherein said second means includes (c) means for forming products of ones of said initial estimated values and ones of said final estimated values.

9. The apparatus defined in claim 8 wherein said forming means further includes means for forming adaptively updated coefficients in response to an error signal formed by quantizing demodulated version of a data recovery signal, said last mentioned signal representing the difference between one of said initial estimated values and corresponding distortion replica output from said non-linear canceller, and (d) means for accumulating the products of ones of said coefficients and outputs from said product forming means.

10. A method of processing received samples of a modulated data signal representing a stream of data symbols, comprising the steps of
forming responsive to said received samples a first set of decisions as to the value of said data symbols,
forming a replica of non-linear distortion in said data signal in response to a weighted sum of the products of the values of decisions in said first set, and
forming, responsive to signals including said replica, final decisions as to the values of said data symbols.

11. The method defined in claim 10 wherein said replica forming step is performed jointly in response to decisions in said first set and a second set of final decisions for previously processed data symbols.

12. A method of providing non-linear equalization of samples of a received modulated data signal in order to form final decisions as to the values of data symbols represented thereby including the steps of:
forming tentative decisions as to the values of said data symbols,
forming a replica of the non-linear distortion in said modulated data signal in response to said tentative decisions,
forming a data recovery signal by eliminating distortion represented by said replica from a linearly fitted version of said received data signal, and
forming said final decisions by quantizing a demodulated version of said data recovery signal.

13. A method for recovering the values of data symbols corresponding to a series of received samples of a modulated data signal, said method including the steps of
(a) adaptively generating an initial estimate of the values of each of a first plurality of data symbols jointly in response to (1) a plurality of previously processed received samples and (2) a plurality of error values associated with the previously estimated symbol values corresponding to said previously processed samples, and
(b) adaptively generating a final estimate of the values of each of said data symbols jointly in response to (1) said initial estimated values of said first plurality of data symbols, and (2) the finally estimated values of a second plurality of data symbols.

14. The method defined in claim 13 wherein said final estimate generating step includes forming a replica of non-linear distortion in said received samples by computing the products of ones of said initial estimated values and ones of said final estimated values.

15. The method defined in claim 14 wherein said final estimate generating step further includes forming adaptively updated coefficients in response to an error signal formed by quantizing a demodulated version of a data recovery signal, said last mentioned signal representing the difference between one of said initial estimated values and its corresponding non-linear distortion replica, and accumulating the products of ones of said coefficients and outputs generated in said product forming step.

* * * * *